US007646867B2

(12) United States Patent
Plotkin et al.

(10) Patent No.: US 7,646,867 B2
(45) Date of Patent: Jan. 12, 2010

(54) SYSTEM AND/OR METHOD FOR ENCRYPTING DATA

(75) Inventors: Serge Plotkin, San Carlos, CA (US); Hristo Bojinov, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 795 days.

(21) Appl. No.: 11/223,444

(22) Filed: Sep. 9, 2005

(65) Prior Publication Data

US 2007/0174634 A1    Jul. 26, 2007

(51) Int. Cl.
*G09C 5/00*    (2006.01)
*G06F 11/30*    (2006.01)
(52) U.S. Cl. .......................................... 380/28; 380/59
(58) Field of Classification Search .................. 380/28, 380/54; 713/189, 191
See application file for complete search history.

(56) References Cited

U.S. PATENT DOCUMENTS

| 6,993,661 | B1 | 1/2006 | Garfinkel |
| 2002/0073324 | A1* | 6/2002 | Hsu et al. .................... 713/189 |
| 2002/0144148 | A1* | 10/2002 | Hashem et al. ............. 713/201 |
| 2003/0037248 | A1 | 2/2003 | Launchbury et al. |
| 2004/0153642 | A1 | 8/2004 | Plotkin et al. |
| 2005/0033988 | A1 | 2/2005 | Chandrashekhar et al. |
| 2005/0041812 | A1 | 2/2005 | Sundararajan et al. |
| 2005/0080761 | A1 | 4/2005 | Sundararajan et al. |
| 2005/0102498 | A1 | 5/2005 | Bojinov et al. |
| 2005/0160044 | A1* | 7/2005 | Hori et al. ...................... 705/51 |
| 2005/0238175 | A1 | 10/2005 | Plotkin et al. |

FOREIGN PATENT DOCUMENTS

WO    WO 0215579 A1 *    2/2002

OTHER PUBLICATIONS

Decru, Inc., "Decru Datafort™ Storage Security Appliances", © 2004, 2 pages.
Decru, Inc., "Decru Datafort™ E-Series Storage Security Appliances—Transparent Data Security for Network Attached Storage (NAS)", © 2004, 2 pages.
Decru, Inc., "Decru Datafort FC-Series Storage Security Appliances—Comprehensive Security for Storage Area Networks and Tape Backup", © 2004, 2 pages.
U.S. Appl. No. 11/223,443, filed Sep. 9, 2005, Serge Plotkin.
U.S. Appl. No. 11/222,684, filed Sep. 8, 2005, Serge Plotkin.
U.S. Appl. No. 11/223,445, filed Sep. 9, 2005, Serge Plotkin.
U.S. Appl. No. 11/223,890, filed Sep. 9, 2005, Serge Plotkin.

* cited by examiner

*Primary Examiner*—Nasser G Moazzami
*Assistant Examiner*—Travis Pogmore
(74) *Attorney, Agent, or Firm*—Cesari and McKenna, LLP

(57) ABSTRACT

A method, system and article for encrypting data by applying an encryption process, wherein the encryption process includes storing progress data relating to the progress of the encryption process so that the encryption process may be resumed after an interruption. Even more specifically, after the interruption, progress data relating to the progress of the encryption process is accessed. Portions of the progress data are compared to determine the last encrypted data segment. After the last encrypted data segment, the encryption process at the data segment is resumed.

16 Claims, 5 Drawing Sheets

SYSTEM AND/OR METHOD FOR ENCRYPTING DATA

BACKGROUND

This disclosure is related to systems and/or methods for encrypting data.

One difficulty with state of the art technology for encrypting data concerns the ability to interrupt and/or resume an encryption process. For example, during an encryption process, if the process is interrupted, it may be difficult to correctly resume the process without starting over, or there may be errors associated with not starting over.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

DETAILED DESCRIPTION

Figure 1:
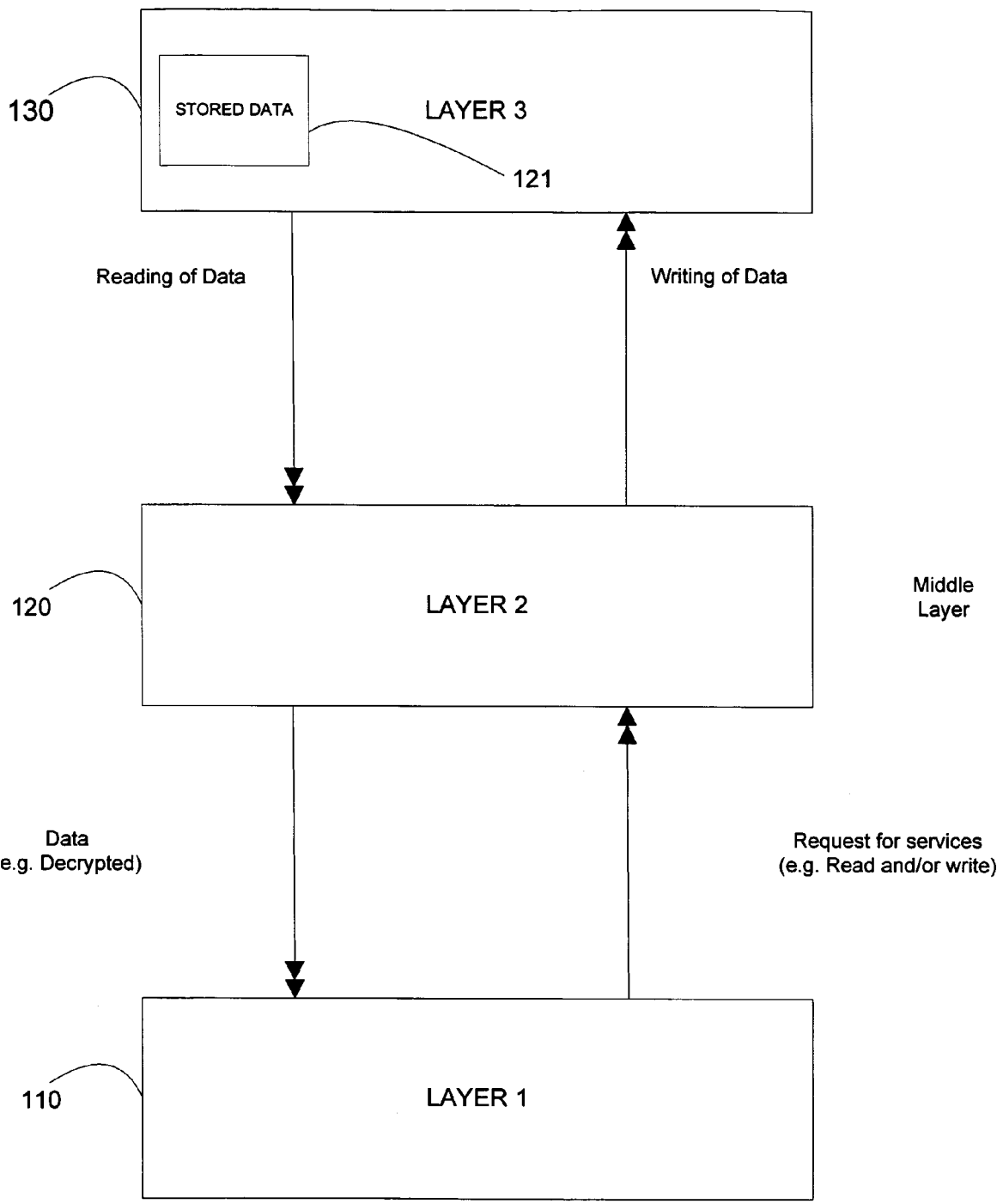
FIG. 1 is a schematic diagram illustrating an embodiment of a system that may be implemented for encrypting data.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

As pointed out above, one difficulty with state of the art technology for encrypting data concerns the ability to interrupt and/or resume an encryption process. For example, during an encryption process, if the process is interrupted, it may be difficult to correctly resume the process without starting over, or there may be errors associated with not starting over. Additionally, without loss of generality, encryption refers to a process or combination of processes in which data is coded so that the content of the data is not capable of being employed or understood by a person or a device without first being decoded back to the previous form or format it had prior to being encrypted. It is noted that in this context, the term encryption includes re-encryption. Thus, decryption, in this context, refers to a process of decoding encrypted data back to the form or format it had prior to encryption.

In one example, an encryption process may be interrupted, such as due to a system failure, a power outage and/or a software crash, such as on the device performing the encryption process, and may additionally be interrupted due to resource shortage such as a lack of memory, bandwidth, or processing power of the device performing the encryption process, for example. However, it is worthwhile to note that the claimed subject matter is not limited to any particular reason for or cause of an interruption. Nonetheless, as will be explained in greater detail later, if an encryption process is subsequently resumed after being interrupted, which may comprise starting over from the beginning or substantially earlier in the process, it may be difficult to determine which data was encrypted and which was not encrypted prior to interruption. It may be desirable to provide a method and/or system to provide functionality including storing the progress of the encryption process so that the process may be resumed, which may comprise marking the last portion of data encrypted and/or the last portion of data not encrypted prior to the process being interrupted, for example. A method or system such as this may likewise provide functionality including minimizing the downtime that may result from an interrupted encryption process. Likewise, an encryption process may be implemented in a system, and a method as described herein may be implemented, and may result in minimal downtime of the system and/or downtime approaching zero for the system, from the perspective of users of the system, for example.

"Interrupted" as referred to herein relate to stopping a process or group of processes that may be executing. For example, a process may be stopped prior to the completion of the process if the process has a point of completion, and stopping may comprise interrupting the process. Additionally, a process may not have a point of completion but may be ongoing, and stopping may comprise interrupting the process. However, this is merely an example of instructions and claimed subject matter is not limited in this respect.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Instructions" as referred to herein relate to expressions which represent one or more logical operations. For example, instructions may be "machine-readable" by being interpretable by a machine for executing one or more operations on one or more data objects, such as, for example, a processor. However, this is merely an example of instructions and claimed subject matter is not limited in this respect. In another example, instructions as referred to herein may relate to encoded commands which are executable by a processor or other processing circuit having a command set which includes the encoded commands. Such an instruction may be encoded in the form of a machine language understood by the processor or processing circuit. Again, these are merely examples of an instruction and claimed subject matter is not limited in these respects.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical and/or semiconductor storage media. However, these are merely examples of a storage medium and claimed subject matter is not limited in these respects.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting,""identifying," "initiating," "querying," "obtaining," "hosting," "maintaining,""representing," "modifying," "receiving," "transmitting," "storing," "authenticating," "authorizing," "hosting," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

A "computer program" as referred to herein relates to an organized list of instructions that, if executed, results in or causes a computer, computing device and/or machine to behave in a particular manner. Here, for example, a computer program may comprise machine-readable instructions that are executable to perform one or more desired tasks. In one particular embodiment, although claimed subject matter is not limited in this respect, a computer program may define input data and output data such that execution of the program may provide output data based, at least in part, on the input data. However, these are merely examples of a computer program and claimed subject matter is not limited in these respects.

An "application" as referred to herein relates to a computer program or group of computer programs capable of providing a result and/or action. In a particular embodiment, for example, such an application may comprise a program that performs desired tasks in support of an enterprise, although claimed subject matter is not limited in this respect. For example, an application may comprise one or more end-user programs, such as database programs, spreadsheet programs, and/or word processor program ,that are accessible through a network browser, electronic mail, interactive games, video and/or image processing programs, calendars, financial application software, inventory control systems and/or the like. However, these are merely examples of an application and claimed subject matter is not limited in these respects.

A "user" as referred to herein relates to an individual and/or entity comprising an identity and is capable of receiving and/or employing a resource. In one particular embodiment, although claimed subject matter is not limited in this respect, a user may comprise an individual in an organization and/or enterprise that is capable of interacting with applications hosted by information services, enabled with one or more computing platforms for example, provided to individuals in the organization and/or enterprise. In an alternative embodiment, a user may comprise a system, computing platform, application and/or other type of entity capable of interacting with such applications. In another embodiment, a user may comprise an individual and/or entity having administrative rights and/or extra permissions to manage multi-user computing environments. Such users may be referred to as administrators. However, these are merely examples of a user and claimed subject matter is not limited in this respect.

"Stored data" as referred to herein relates to information stored in a storage medium in some retrievable format. In a particular example, a "data storage system" may maintain stored data on one or more storage mediums such as, as identified above, magnetic disk, magnetic tape, and/or semiconductor devices in a format that is retrievable in response to requests and/or commands. In one particular embodiment, a data storage system may define a file structure that identifies one or more portions of stored data by a file name according to a file and/or directory structure. Alternatively, a data storage system may define a data block structure that associates stored data with one or more locations on a storage medium. However, these are merely examples of how a data storage system may maintain stored data in a retrievable format and claimed subject matter is not limited in this respect.

FIG. 1 is a schematic diagram illustrating an embodiment 100 of a typical architecture in which an embodiment of. a technique to encrypt data is employed, although claimed subject matter is not limited in scope to this particular architecture or embodiment. In this particular embodiment, FIG. 1 includes a first layer 110, a second layer 120 and a third layer 130. Thus, for this particular embodiment, first layer 110 may make a request for services, such as that data be written and/or read. Second layer 120 may receive the request and may then fulfill it, assuming, for example, that it is able to do so. There are a variety of services that may be provided by second layer 120. Frequently such services are data-related, such as authentication, authorization, and/or data storage and/or retrieval, although these are just examples.

In this particular approach, second layer 120 may supplement and/or enhance services that may be available from third layer 130. one service that might be provided by second layer 120 includes security. For example, this may include firewall functionality, such as packet filtering, packet inspection (e.g., stateful and/or stateless), packet format validation, terminating IPSec connections, and/or the like. Another service that might be provided includes data encryption and/or decryption.

Thus, in this particular example, if first layer 110 requests that data be written, second layer 120 may encrypt the data to be written. The data, once encrypted, may be stored by or at a third layer, such as 130. This is illustrated in FIG. 1 by 121. Likewise, second layer 120 may, upon another request for services by first layer 110, such as a read request, retrieve the stored, encrypted data from layer three, decrypt it, and provide it to first layer 110. One potential advantage of an embodiment, such as previously described, is that encryption and/or decryption of the data may be made transparent to third layer 130, although it is not necessary that this be the case, even for this embodiment and, thus, claimed subject matter is not limited in scope to embodiments where this is so. Likewise, although claimed subject matter is not limited in scope in this respect, encryption may be also made transparent to first layer 110, e.g., a "consumer" of the services. Likewise, in another embodiment, any two layers, such as first layer 110 and third layer 130, may reside on the same computing platform and even comprise the same layer in some embodiments, although claimed subject matter is not limited in scope in this respect, of course. Also, in other embodiments, any of first layer 110, second layer 120 and/or third layer 130 may reside on multiple computing platforms.

Nonetheless, for such an embodiment, encryption and/or decryption of data stored at or on third layer 130 may not impact operation of layer 130. In this example embodiment, layer 130 may treat data substantially the same regardless of whether or not the data is encrypted. This may provide some benefits, such as making interoperability with other systems possible. Of course, this is just one example of an embodiment of a technique for managing retention and/or discarding of stored data and, as previously stated, claimed subject matter is not limited in scope to such an embodiment.

Depending at least in part on the situation and/or the system architecture, for example, data may be encrypted for a variety of reasons. For example, data may be encrypted, at least in part, by utilizing an encryption key or set of keys. An encryption key, in this context, may comprise a portion of data that may include one or more values, such as alphanumeric values, but may typically be in the form of bits or bytes of data that may be utilized to perform encryption and/or decryption, for example. Encryption keys may be changed after a period of time and/or on the occurrence of an event. As one example, without limiting the scope of claimed subject matter, a key may change upon meeting selected expiration criteria associated with a particular key. In this example, the encrypted data may also be re-encrypted by use of another key. This process may be referred to as rekeying, and in this context, rekeying refers to a process or group of processes wherein data that may be encrypted by use of one or more keys may be re-encrypted by utilizing one or more other keys, such as a differing key or set of keys. However, it is worthwhile to note that claimed subject matter is not so limited, and re-encryption may, in some potential implementations, be performed without necessarily performing rekeying.

As mentioned previously, an encryption process may be interrupted for a variety of reasons, and it may be desirable to resume the encryption process without necessarily starting completely over or even losing the benefit of a significant amount of processing that may have taken place prior to interruption. It may be desirable to employ an approach or technique that is susceptible to storing or otherwise tracking progress of an encryption process. For example, without limiting the scope of claimed subject matter, it may be desirable to have an indication of the last portion of data to be encrypted and/or the last portion of data that may not have been encrypted prior to the interruption. This information may facilitate resuming encryption from the point at which it was interrupted or at least sufficiently close so that processing that was performed may still be recovered.

Of course, many techniques or implementations are possible within the scope of claimed subject matter and claimed subject matter is not limited in scope to this particular example. For convenience, in this context, with respect to describing particular embodiments, one or more portions or subportions of data may be referred to as one or more segments. A segment of data, in this context, therefore, may comprise, without limitation, a contiguous or non-contiguous portion or subportion of data. Examples include, without limitation, a portion or subportion of a block of data, a data file, a data fragment, a sector of data, and the like. Additionally, an encryption process may follow a pattern, such as by encrypting data file by data file, sector by sector and/or block by block, for example. Of course, this is merely one example implementation and may other implementations within the scope of claimed subject matter are possible. However, such a pattern may depend at least in part on a variety of different factors, one such factor comprising, without loss of generality, how data may be stored.

In at least one embodiment within the scope of claimed subject matter, a process for resuming an encryption process after an interruption is described. Again, this is one example implementation and other implementations other than this particular example are possible and intended to be covered by claimed subject matter. It is noted that an interruption may result from a failure, such as a system failure. However, in this particular embodiment, interruptions of an encryption process other than a failure are included.

In this particular embodiment, as previously suggested, progress of an encryption process may be stored or otherwise tracked. This may comprise, for example, storing progress of an encryption process so that the encryption process may be resumed after an interruption of encryption. In this context, progress data refers to data that, in combination, identifies a point in the encryption process sufficiently precisely so that encryption may be resumed from that point. In at least one embodiment, storing progress of an encryption process may comprise storing and/or otherwise providing the last segment of data that was encrypted and/or the last segment of data that was not encrypted. Additionally, although claimed subject matter is not so limited, a data structure may be utilized in conjunction with an implemented encryption process to store progress of an encryption process, for example. A data structure, in this context, may comprise one or more portions of data that may be contiguous or non-contiguous, and may be stored in one or more memory locations and/or one or more memory devices, for example. A data structure, in this particular embodiment, may provide a capability to mark or indicate a point of interruption of the encryption process and/or provide data that may be utilized to resume from the point of interruption or relatively close to the point of interruption in terms of the overall process, for example.

A data structure in accordance with at least one embodiment may include a plurality of substructures. Substructures here may store data relating to encryption, here in one or more data fields. For example, a substructure may include a plurality of data fields that may include progress data. Progress data may comprise, for example, values that are capable of being incremented or otherwise modified predictably, such as sequentially by value, for example. Although claimed subject matter is not limited in scope in this respect, incrementing or toggling a known value, such as, by way of example only, a Boolean value, may provide one technique to track progress of an encryption process, as described in more detail hereinafter.

Progress data may be stored in one or more data fields of a substructure, which may be implemented by a register or counter, for example, in a computing platform or other device, but claimed subject matter is not so limited. For example, progress data may be stored in whole or part in second layer 120 of FIG. 1, and may be stored in a storage security appliance of the second layer 120, for example. In at least one embodiment, progress data may comprise two portions of data, in two data fields of a data structure, for example. In one particular embodiment, for example, it may comprise two values capable of being incremented or otherwise modified. For example, although claimed subject matter is not limited in scope in this respect, values, such as a Boolean value, for example, may be toggled. Alternatively, another example, again not intended to limit the scope of claimed subject matter, may include incrementing a known value. In operation, one or more of the values may be altered. Knowing the values and the alterations made as progress of encryption takes place may be at least partially mark or otherwise indicate progress of the encryption process. Thus, if encryption is interrupted, these values indicate at what point the process was interrupted. More specifics on one particular embodiment will be explained below, although, it is intended that claimed subject matter not be limited to this example or to any specific example or implementation.

In one particular embodiment, although claimed subject matter is not limited in scope in this respect, a data structure having a first and a second substructure may be utilized in an encryption process as follows: progress data, such as previously described, for example, relating to the encryption process, may be stored. Likewise, progress data may be updated as encryption takes place. For example, a first substructure may include two or more values that may be updated. Specifically, here, these values may be updated, such as, in this embodiment, by toggling, as a segment of data is encrypted. For example, a first Boolean value of the first substructure may be updated, such as by toggling the value from a '0' to a '1'. This toggling indicates that a segment of data is being encrypted. The segment of data to be encrypted may then be copied or written into the first substructure. Additionally, the location of the segment of data may be copied or written into the first substructure. After the segment is encrypted, a second Boolean value may likewise be updated by toggling the value from a '0' to a '1'. The now encrypted segment of data may then be copied or written to the location that the previously unencrypted data segment had occupied. Thus, in the first substructure, having both Boolean values match indicates completion of encryption of a segment of data. This process may likewise be repeated for a second substructure with another data segment and so forth. Thus, in this embodiment, as segments are encrypted, the data structure is updated with information that includes the data, its location and values representing whether or not encryption has completed for a given data segment.

For this embodiment, if an interruption of encryption later takes place, progress data, such as described above, may be utilized to resume the process as follows. The Boolean values described above in the substructures may be compared. If the values are equal and, in this example, comprise '1', encryption of the segment of data in the substructure was completed. However, if the values are not equal, encryption was not completed. Thus, the point at which the encryption process was interrupted has, in effect, been marked. Furthermore, if both data values of both substructures are equal and, in this example, comprise '1', encryption of both data segments in the data structure was completed. In this case, therefore, the most recently updated substructure indicates the last segment of data that was successfully encrypted. The encryption process may be resumed by encrypting the next segment of data after that particular segment. In this particular embodiment, therefore, If the process in interrupted, progress data may be utilized, as just described, for example, such that the encryption process may continue without starting over, without data corruption and/or without other potential process anomalies typically attributed to interrupting and resuming an encryption process.

As is well-known, there are a variety of file types and/or structures currently in use for storing data. As just one example, a Network File System (NFS) may be utilized to store data. However, a SAN may be utilized to store data by use of a block based protocol, such as an iSCSI (Internet Small Computer System Interface) protocol, for example. In contrast, Network Attached Storage (NAS) may store data by use of a file based protocol, for example. However, it is worthwhile to note that claimed subject matter is not limited to any particular data structure and/or data storage device or technique either now known or to be later developed. It is intended that claimed subject matter cover all such types, structures and/or conventions that may exist now or in the future. For example, any block-based, file based, or content-addressable storage technique may be utilized, including NAS, SAN, storage array(s), file server(s) and/or data filer(s), for example. As suggested previously, for convenience, but without intending to limit the scope of claimed subject matter, throughout the remainder of this specification, a particular portion or subportion of data, regardless of the particular form or size of the portion or subportion employed, for example, may be referred to as a data segment or segment.

Figure 2:
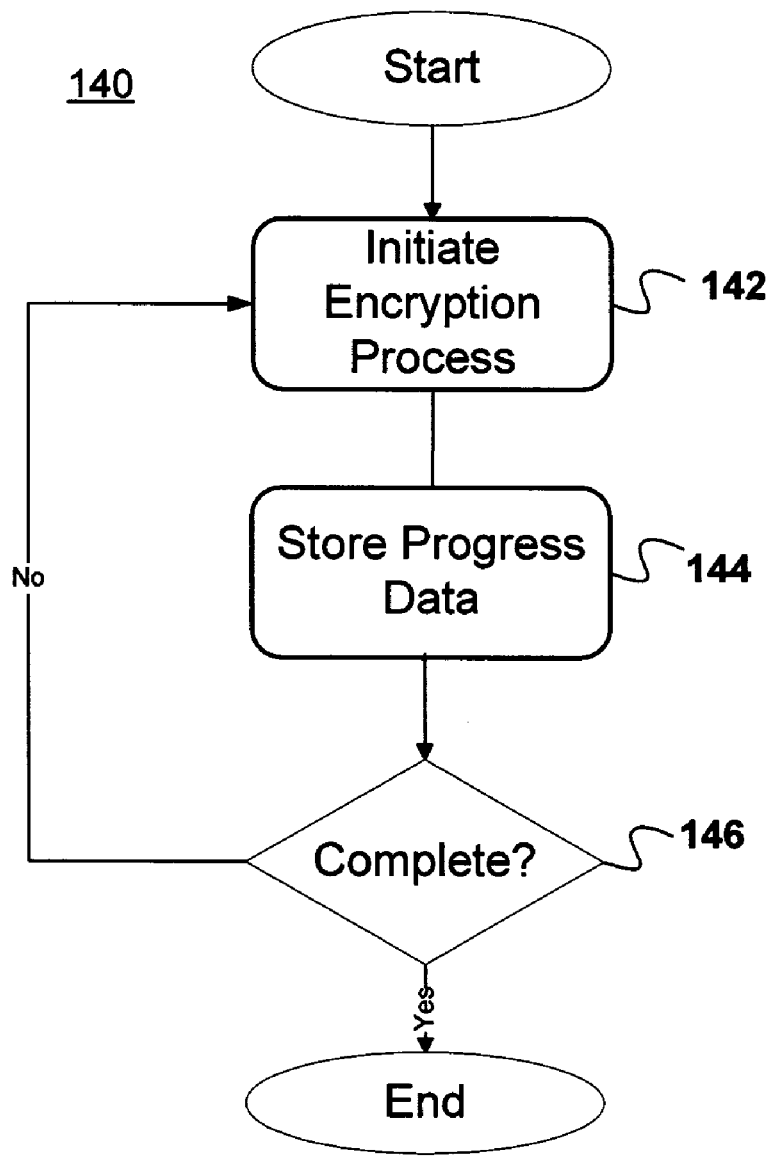
FIG. 2 is a flow diagram illustrating an embodiment of a method for encrypting data.

FIG. 2 is a flow diagram of an embodiment 140 of a process for encrypting data. However, claimed subject matter is not limited in scope to this particular example. For example, for flow diagrams presented herein, the order in which blocks are presented does not necessarily limit claimed subject matter to any particular order. Additionally, intervening blocks not shown may be employed without departing from the scope of claimed subject matter. Likewise, flow diagrams depicted herein may, in alternative embodiments, be implemented as a combination of hardware, software and/or firmware, such as part of a computer or computing system.

Referring now to FIG. 2, at block 142, an encryption process may be initiated. The encryption process may be performed on one or more segments of data. As previously explained, in this context, the term segment of data, data segment, or simply segment is intended to make it clear that any portion or subportion of data. Here, this particular segment of data may comprise a portion or subportion that may be designated for encryption by an encryption process. At block 144, progress data may be stored or updated. Although numerous ways of storing or tracking progress data may be utilized, in at least one embodiment, this may comprise storing data relating to an encryption process, such that the process may be recoverable from an interruption. For example, storing the last segment of data that was encrypted and/or the last segment of data that was not encrypted may be employed. In one embodiment, this may provide the storing of data that was encrypted and/or data that was not encrypted, "on the fly"; meaning, for example that the process of storing the data may not involve an interruption to other processes, for example. However, the claimed subject matter is not to storage "on the fly"; for example. In the illustrated embodiment, storing progress data may comprise updating a data structure, for example. Of course, embodiments within the scope of claimed subject matter may not necessarily employ a data structure. For example, a similar approach may be applied by processing data without the use of a data structure, as such. For example, values may be stored and toggled, in place, for example, to provide a functional equivalent to the process embodiment described above. In operation, whether in a data structure form or not, one or more of the values may be altered, and the altered values may be at least partially utilized to mark the point of interruption of an encryption process, as explained previously. Additionally, the substructures may include data representative of one or more segments of data, such as a segment of data that may be encrypted and/or a segment of data that has been encrypted, and/or the location of the one or more segments of data on the applicable storage device, such as path and/or file name. At block 146, a determination may be made whether the encryption process is complete. If the encryption process has been completed, the functionality of process 140 may be stopped.

For this particular embodiment, a data structure may be stored on one or more data storage devices of a system, such as system 100 of FIG. 1, for example. In this particular embodiment, the data structure may be stored at least partially in a storage location separate from the location where the data segment may be stored, although claimed subject matter is not limited in scope in this respect. For example, it may be desirable in some embodiments to store data populating at least a portion of the data structure in one or more memory locations that may be capable of maintaining data during a power failure, such as memory with a power backup and/or non-volatile memory. For example, such data may be stored in battery-backed random access memory (RAM) of a data storage device, and/or may be stored in one or more types of non-volatile memory, such as flash memory, for example.

Figure 3:
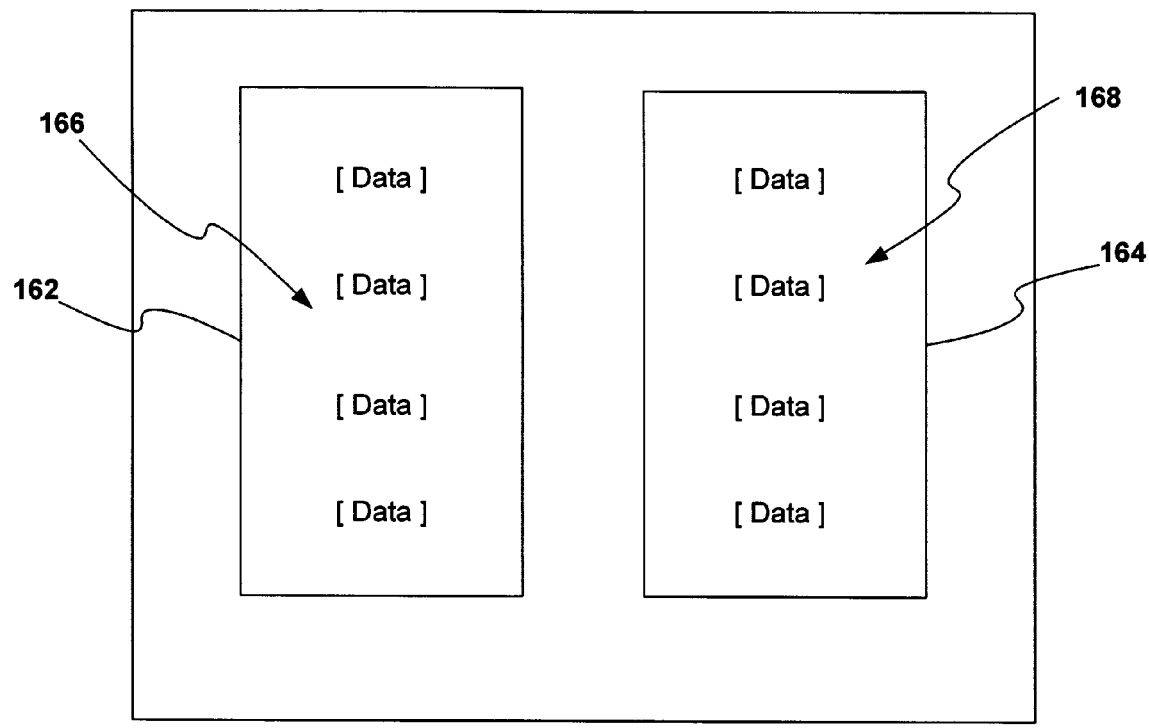
FIG. 3 is a schematic diagram illustrating an embodiment of a data structure that may be utilized, such as with an embodiment of a method for encrypting data.

Although embodiments within the scope of claimed subject matter may not necessarily employ a data structure, a data structure that may be employed in at least one embodiment is illustrated in FIG. 3. Referring now to FIG. 3, there is illustrated a schematic diagram 160 of an embodiment of a data structure that may be utilized as part of an embodiment of an encryption process that permits recovery after interruption. Although illustrated as having two substructures 162 and 164, it is worthwhile to note that claimed subject matter is not so limited. Thus, claimed subject matter may include any format for a data structure. Furthermore, as previously suggested, some embodiments may not employ a data structure if processing is employed that provides similar capability, but without employing a data structure. However, in this particular embodiment, data structure 160 comprises two substructures 162 and 164, as illustrated, for example, in FIG. 4.

The two substructures may include data, such as, for example 166 and 168. Again, although in this particular embodiment, the substructures are illustrated as having four portions of data each, claimed subject matter is not so limited and these examples are merely for purposes of illustration. Additionally, in alternate embodiments other substructures may be employed. However, in this particular example, substructures 162 and 164 may each include, for example, a data segment being encrypted and two or more Boolean values, such as described previously. Additionally, substructures 162 and/or 164 may include data that may provide the location of the data segment.

As explained previously, an encryption process may be interrupted before being successfully completed. It may be desirable to provide the capability to resume an encryption process in these circumstances without starting encryption at the beginning of the entire process or substantially earlier in the process. In at least one embodiment, a recovery process may be employed to this end, as described in more detail below.

Figure 4:
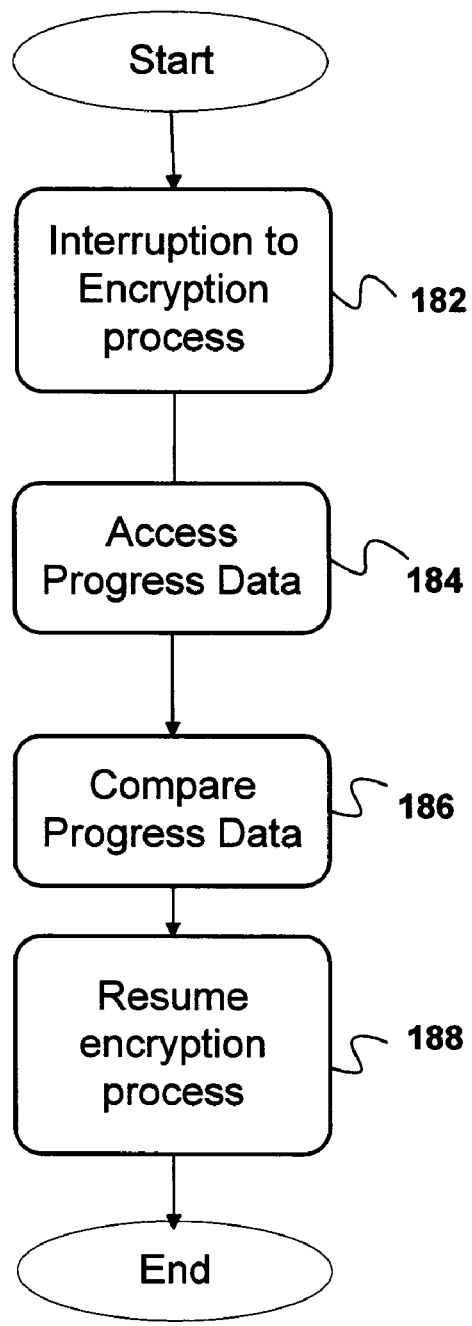
FIG. 4 is a flow diagram illustrating an embodiment of a method for resuming an encryption process, which may be employed in conjunction with an embodiment of a method for encrypting data, for example.

Referring now to FIG. 4, there is illustrated a flow diagram of one embodiment 180 of a process for recovering for an interruption. In this particular embodiment, progress data is stored so that if an interruption occurs, the encryption process may be resumed.

At block 184, stored progress data may be accessed after an interruption has occurred. The accessed progress data may be stored in a data structure, such as data structure 160 of FIG. 4, for example, and may include data useful in connection with resuming encryption after interruption. For this particular embodiment, progress data may be stored in a device physically separate from the device storing the data being encrypted, although claimed subject matter is not limited in scope in this respect. At block 186, a comparison may be made between two or more portions of the progress data. This may comprise, for example, comparing two or more data values of a data structure, to determine which substructure may include the most recently encrypted data and/or the most recently written unencrypted data, for example.

Figure 5:
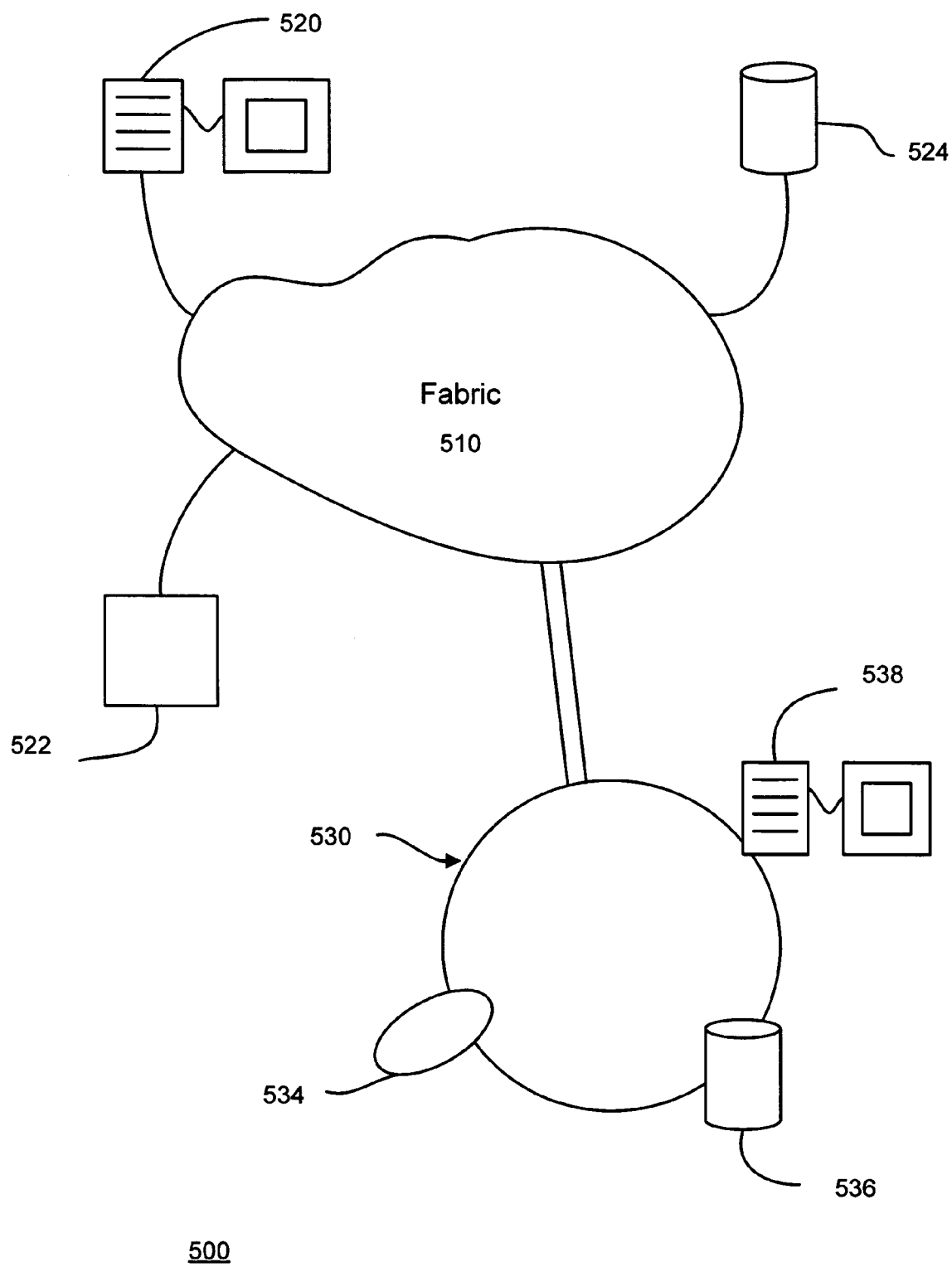
FIG. 5 is a schematic diagram illustrating an embodiment of a system that may be implemented for encrypting data.

FIG. 5 is a schematic diagram of an example embodiment of a communications network or system 500 that may employ an embodiment in accordance with claimed subject matter. In this example, embodiment 500 comprises a switched fabric 510 and a plurality of devices, such as 520, 522, 524, and/or groups of devices, such as 534, 536, and 538, as indicated with respect to logical loop 530, for example. References to "a switch" or to "switches" are intended to refer to a generic switch. In this context, then, the term switch refers to a device that includes a processor and memory and that is adapted to or has the capability to route frames or packets between two or more separate devices. In general, a switched fabric, such as fabric 510, may be communicatively coupled to various devices, such as, here, 520, 522, and 524, and may operate as a switching network to allow these devices to communicate with each other. Devices 520, 522, and 524 may comprise any type of device, such as, for example, a computing platform, a storage device, and/or the like, and may be communicatively coupled via fabric 510 by employing point-to-point communications technology or techniques, as one example. In this particular embodiment, fabric 510 comprises a variety of communicatively coupled switches. In this particular embodiment fabric 510 is also in communication with logical loop 530. Loop 530 here includes devices 534, 536 and 538. In this particular embodiment, loop 530 comprises an arbitrated loop with ring couplings for providing multiple nodes with the ability to arbitrate access to shared bandwidth. It is, of course, appreciated that this particular embodiment is merely an illustrative example and claimed subject matter is not limited in scope in any way to this particular embodiment.

The following discussion details several possible embodiments for accomplishing this, although these are merely examples and are not intended to limit the scope of claimed subject matter. As another example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage. media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example. It will, of course, be understood that, although particular embodiments have just been described, claimed subject matter is not limited in scope to a particular embodiment or implementation.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method, comprising:

initiating an encryption process by a processor, to encrypt at least one segment of data in a data storage system to be stored on a first device, wherein a segment of data is a portion of data that is designated for encryption by the encryption process;

storing, on a second device physically separate from the first device, a data structure relating to the encryption process wherein the stored data indicates a last segment of data that was not encrypted by the encryption process;

toggling at least one Boolean value in the data structure to mark a point of interruption of the encryption process;

in response to an interruption in the encryption process, accessing the stored data relating to the encryption process;

comparing at least two data values of the data structure to determine which data value includes a most recent stored last segment of data that was not encrypted; and resuming the encryption process from the point of interruption according to the most recent stored last segment of data that was not encrypted.

2. The method of claim 1, wherein storing progress data further comprises:

updating data to indicate that encryption of a data segment has initiated;

copying the data segment to be encrypted; and updating data to indicate that encryption of the data segment is complete.

3. The method of claim 2, and further comprising overwriting the copied data segment with the encrypted data segment.

4. The method of claim 2, wherein updating data further comprises incrementing a data value.

5. The method of claim 1, wherein said comparing comprises determining if data segments included in the progress data were successfully encrypted.

6. The method of claim 5, wherein said determining further comprises determining which, if any data segments, included in the progress data were successfully encrypted.

7. An article comprising:

storage medium having stored thereon instructions that, if executed, result in, initiating an encryption process by a processor, to encrypt at least one segment of data in a data storage system to be stored on a first device, wherein a segment of data is a portion of data that is designated for encryption by the encryption process;

storing, on a second device physically separate from the first device, a data structure relating to the encryption process wherein the stored data indicates a last segment of data that was not encrypted by the encryption process;

toggling at least one Boolean value in the data structure to mark a point of interruption of the encryption process;

in response to an interruption in the encryption process, accessing the stored data relating to the encryption process;

comparing at least two data values of the data structure to determine which data value includes a most recent stored last segment of data that was not encrypted; and resuming the encryption process from the point of interruption according to the most recent stored last segment of data that was not encrypted.

8. article of claim 7, wherein said storage medium further includes instructions that, if executed, further results in:

updating data to indicate that encryption of a data segment has initiated;

copying the data segment to be encrypted; and updating data to indicate that encryption of the data segment is complete.

9. article of claim 8, wherein said storage medium further includes instructions that, if executed, further results in: overwriting the copied data segment with the encrypted data segment.

10. article of claim 9, wherein said storage medium further includes instructions that, if executed, further results in: said updating data comprising toggling a data value.

11. article of claim 9, wherein, said updating data comprises incrementing a data value.

12. The article of claim 7, wherein said storage medium further includes instructions that, if executed, further results in: said comparing comprises determining if data segments included in the progress data were successfully encrypted.

13. The article of claim 12, wherein said storage medium further includes instructions that, if executed, further results in: said determining further comprises determining which, if any data segments, included in the progress data were successfully encrypted.

14. A system, comprising:

a first device having a processor configured to (i) initiate an encryption process to encrypt at least one segment of data in a data storage system to be stored on a first device, wherein a segment of data is a portion of data that is designated for encryption by the encryption process, (ii) access stored data on a second device relating to the encryption process in response to an interruption in the encryption process, (iii) compare at least two data values of the data structure to determine which data value includes a most recent stored last segment of data that was not encrypted, and (iv) resume the encryption process from the point of interruption according to the most recent stored last segment of data that was not encrypted and the second device physically separate from the first device and having a memory configured to (i) store a data structure relating to the encryption process wherein the stored data indicates a last segment of data that was not encrypted by the encryption process and (ii) toggle at least one Boolean value in the data structure to mark a point of interruption of the encryption process.

15. system of claim 14 wherein the second device is further configured to:

update data to indicate that encryption of a data segment has initiated;

copy the data segment to be encrypted; and update data to indicate that encryption of the data segment is complete.

16. system of claim 15 wherein the second device is further configured to overwrite the copied data segment with the encrypted data segment.

* * * * *

UNITED STATES PATENT AND TRADEMARK OFFICE
CERTIFICATE OF CORRECTION

| | | |
|---|---|---|
| PATENT NO. | : 7,646,867 B2 | Page 1 of 1 |
| APPLICATION NO. | : 11/223444 | |
| DATED | : January 12, 2010 | |
| INVENTOR(S) | : Plotkin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1124 days.

Signed and Sealed this

Twenty-eighth Day of December, 2010

David J. Kappos
*Director of the United States Patent and Trademark Office*